3,706,736
19-HYDROXY-3-AZA-A-HOMO-STEROIDS
Oskar Jeger, Zollikerberg, and Hans Ueli Wehrli, Schaffhausen, Switzerland, assignors to Ciba-Geigy Corporation, Summit, N.J.
No Drawing. Filed Sept. 22, 1969, Ser. No. 860,089
Claims priority, application Switzerland, Sept. 27, 1968,
14,489/68, 14,490/68
Int. Cl. C07d 41/08, 99/04
U.S. Cl. 260—239 BB    10 Claims

ABSTRACT OF THE DISCLOSURE

The invention relates to novel compounds of the formula

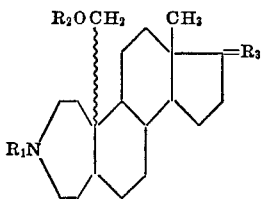

which may contain a double bond in the 4,4α, or the 5,6-position, wherein $R_1$=H or lower alkyl
$R_2O$=a free, esterified or etherified hydroxyl group and
$R_3$=free or ketalized oxo group

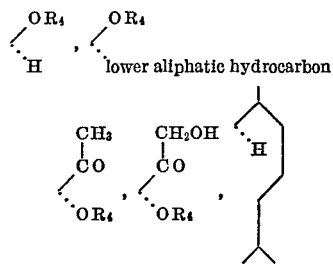

in which $OR_4$ represents a free, esterified or etherified hydroxyl group and a process of manufacturing same.
The new compounds are strong local anesthetics.

---

The present invention is concerned with the manufacture of new 19-hydroxy-3-aza-A-homo-steroids, preferably of the androstane, pregnane or cholestane series, especially of those of the general formula

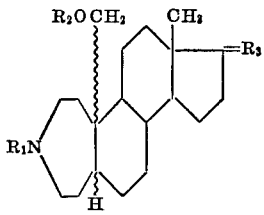

which may contain a double bond in the 4α,5- or 5,6-position and in which $R_1$ represents hydrogen or a lower alkanoyl residue, $R_2O$ stands for a free, esterified or etherified hydroxyl group, preferably for a lower alkanoyl-oxy group or a lower alkoxy residue which may be substituted by phenyl residues, and $R_3$ represents a free or ketalized oxo group, for example the ethylenedioxy group or a β-positioned free, esterified or etherified hydroxyl group together with a hydrogen atom or with a lower aliphatic hydrocarbon residue or an α-positioned hydrogen atom or α-positioned free, esterified or etherified hydroxyl group together with an acetyl or hydroxyacetyl group or derivatives thereof or an α-positioned hydrogen atom together with the 1',5'-dimethyl-hexyl group.

An esterified hydroxyl group is especially a hydroxyl group esterified with an aliphatic, alicyclic, araliphatic or aromatic or heterocyclic carboxylic acid with 1–20 carbon atoms, for example, formic, methylcarbonic acid, acetic, trifluoroacetic, trimethylacetic, propionic, capric, decanoic, undecylenic, hexahydrobenzoic, cyclopentylpropionic, phenylpropionic, benzoic or furancarboxylic acid. An etherified hydroxy group is especially etherified with an aliphatic, cycloaliphatic, araliphatic or heterocyclic alcohol, such as a lower alkanol or with a furanyl or pyranyl alkanol.

Suitable lower aliphatic hydrocarbon residues are, for example, lower alkyl such as methyl, ethyl, propyl or isopropyl residues, lower alkenyl such as vinyl, ally or methallyl residues, or lower alkinyl such as ethinyl or propinyl residues.

The term "lower" as used above or below with reference to hydrocarbon or alkanoyl residues indicates such residues containing 1–5 carbon atoms.

The new compounds possess valuable pharmacological properties. Inter alia, they act strongly on the central nervous system, similarly to the action of the salamander alkaloids. Furthermore, they display a strong local anaesthetic activity and may therefore be used in human and veterinary medicine. They are also valuable intermediates for the manufacture of the salamander alkaloids and their derivatives. Thus, for example, appropriate androstane compounds may be used for the manufacture of the highly active salamander alkaloid cycloneosamandione or of its derivatives.

The new compounds are obtained when a compound of the formula

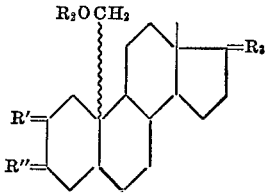

which may contain a double bond in the 4,5 or the 5,6-position but does not contain a further free oxo group and where one of the radicals R' and R" stands for an oxo group and the other for two hydrogen atoms and $R_2$ and $R_3$ have the above meanings, is reacted with hydroxylamine or with a salt thereof, the resulting oxime is subjected to the Beckmann rearrangement and the oxo group in position 4 or 2 and, if desired, a possibly present double bond in position 4a,5 or 5,6 is/are reduced and, if desired, an esterified hydroxyl group present is liberated, a free hydroxyl group is oxidized to the oxo group, a protected oxo group present is converted into the free oxo group, an oxo group present is reduced to the hydroxyl group or removed by reduction, and/or, if desired, at any stage the aza group is acylated, especially acetylated, and/or a resulting base is converted into a salt or quaternary ammonium salt thereof.

Preferably the starting materials of the formula given above, wherein R' represents an oxo group contain the double bond, if present, in the position 5,6 or wherein R" stands for the oxo group, the double bond, if present, or in 4,5-position.

These reactions are carried out in known manner. Thus, for example, the oxime is obtained by reacting the oxo compound with hydroxylamine or a salt thereof, such as hydroxylamine hydrochloride, in the presence of a tertiary base, for example pyridine. The oxime is rearranged according to Beckmann into the aza compound with a strong Lewis acid, for example sulphuric, hydrochloric acid, phosphorus pentachloride, sulphurylchloride or thionylchloride, preferably in an inert solvent such as dioxane. From the 2-oxo-compound there is generally obtained a mixture of the 2-aza and the 3-aza-compound from which the 3-aza-derivative can be isolated by chromatography after first having acylated the mixture.

Starting from a 3-oxo-compound having a double bond in 4,5-position there is always obtained the 3-aza-compound, whereas a compound having no double bond in 4,5-position gives a mixture of the 3- and 4-aza-compound, which is separated after acetylation by chromatography.

The 4- or 2-oxo group is reduced, for example, by means of lithium-aluminium hydride and the possibly present double bond in the 5,6-position preferably with hydrogen in the presence of a platinum catalyst. This gives rise to a mixture of the $5\alpha$- and $5\beta$-isomers which lend themselves well to the usual separation by chromatography. A double bond which may be present in 4,5-position is reduced preferably by means of hydrogen in the presence of a paladium catalyst. There is thus obtained only the $5\alpha$-dihydro compound.

Any ester or protective groups, such as ketals, present in the resulting aza-A-homo compounds can be split hydrolytically and free hydroxyl groups may be oxidized to oxo groups. On the other hand, process products containing free hydroxyl groups can be converted into their esters in known manner, for example by acylation with an hydride or halide of a carboxylic acid. The starting materials used are known or can be manufactured by known processes.

The invention includes also any variant of the process in which an intermediate obtained at any stage of the process is used as starting material and the remaining process steps are performed or in which starting materials are formed under the reaction conditions or in which the reactants may be used in the form of their salts.

The new compounds of the Formula I may be used as medicaments, for example in the form of pharmaceutical preparations containing them in conjunction or admixture with a pharmaceutical organic or inorganic solid or liquid excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, cholesterol or other known medicinal excipients. The pharmaceutical preparations may be, for example, tablets dragées or capsules, or in liquid form solutions, suspensions or emulsions, or in form of ointments or creams. They may be sterilized and/or contain assistants such as preserving, stabilizing, wetting or emulsifying agents, solution promoters, salts for regulating the osmotic pressure, or buffers. They may further contain other therapeutically valuable substances. The pharmaceutical preparations are formulated in the usual manner.

The new compounds may also be used in veterinary medicine, for example in one of the forms mentioned above or in form of feedingstuffs or additives to feedingstuffs, using, for example, the conventional extenders and diluents, or feedingstuffs respectively.

The following examples illustrate the invention without restricting it in any way. The infrared spectra have been recorded in chloroform.

EXAMPLE 1

A mixture of 200 mg. of 2-oxo-17-ethylenedioxy-19-triphenyl-methoxy-$\Delta^5$-$10\alpha$-androstane and 200 mg. of hydroxylamine hydrochloride in 10 ml. of pyridine is boiled for 2 hours, then evaporated and the residue is taken up in methylenechloride and chromatographed on silica gel (Merck, 0.05–0.2 mm.), eluted with a 10:1-mixture of benzene and ethyl acetate, and the eluate is evaporated to furnish 2 - oximino-17-ethylenedioxy-19-tri-phenylmethoxy - $\Delta^5$ - $10\alpha$ - androstene melting at 235–236° C. $[\alpha]_D = -30°$ (c.=0.57 in chloroform). Its infrared spectrum contains bands at 3580 and 1450 cm.$^{-1}$.

A solution of 5.1 g. of the above oxime in 25 ml. of absolute dioxan is mixed at 5° C. with 1.5 ml. of thionyl chloride. The mixture is kept for 2 hours at 20° C., then poured into an ice-cooled aqueous sodium bicarbonate solution and extracted with methylenechloride. Chromatography on silica gel and elution with a 1:2-mixture of benzene+ethyl acetate furnishes a mixture from which the 2-oxo-3-aza-17-ethylenedioxy - A - homo - 19 - triphenylmethoxy-$\Delta^5$-$10\alpha$-androstene is separated by further chromatography on a stepped column. After two recrystallizations from acetone+petroleum ether the product melts at 229–230° C. $[\alpha]_D = -13°$ (c.=0.53 in chloroform). Its infrared spectrum contains bands at 3410, 1665 and 1450 cm.$^{-1}$.

700 mg. of the above compound with 1.4 g. of lithium-aluminium hydride in 250 ml. of dioxan are boiled for 20 hours, then water is dropped in while cooling with ice, the precipitated inorganic phase is filtered off, washed with methylenechloride and the filtrate is evaporated under vacuum. The crude product is acetylated with acetic anhydride and pyridine for 1 hour on a waterbath and then chromatographed on silica gel, to yield N-acetyl-3-aza-17-ethylenedioxy - 19 - triphenylmethoxy-$\Delta^5$-$10\alpha$-A-homoandrostene which, after crystallization from acetone+petroleum ether, melts at 150–155° C. $[\alpha]_D = -25°$ (c.=0.47 in chloroforma), and N-acetyl-3-aza-17-ethylenedioxy - 19-acetoxy-$\Delta^5$-$10\alpha$-A-homo-androstene melting at 112–114° C. $[\alpha]_D = -12°$ (c.=0.50 in chloroform).

18 mg. of N-acetyl-3-aza-17-ethylendioxy-19-acetoxy-$\Delta^5$-$10\alpha$-A-homo-androstene in 2 ml. of 5% aqueous acetic acid are boiled for 1 hour at 90° C., then evaporated under vacuum, chromatographed on silica gel and the unitary eluates are crystallized from ether+hexane. The resulting N-acetyl - 3 - aza-17-oxo-19-acetoxy-$\Delta^5$-$10\alpha$-A-homo-androstene melts at 144–145° C. $[\alpha]_D = +63°$ (c.=0.35 in chloroform). The infrared spectrum of this compound contains bands at 1735 (shoulder), 1630 and 1250 cm.$^{-1}$.

A mixture of 330 mg. of N-acetyl-3-aza-17-ethylenedioxy - 19 - triphenylmethoxy - $\Delta^5$ - $10\alpha$-A-homo-androstene, 2 ml. of acetic anhydride and 0.5 ml. of boron trifluoride etherate is kept for 5 minutes at room temperature, then poured into an ice-cooled aqueous sodium bicarbonate solution, extracted with methylenechloride, and the extract is dried and evaporated. The resulting crude product is once more heated for 1 hour with 2 ml. of 5% acetic acid to remove the ketal group completely from it. After evaporation, chromatography and recrystallization N-acetyl - 3 - aza-17-oxo-19-acetoxy-$\Delta^5$-$10\alpha$-A-homo-androstene melting at 144–145° C. is obtained; according to the mixed melting point, infrared spectrum and thin-layer chromatogram it is identical with the product described above.

The starting material used in this example may be prepared, for instance, as follows:

1 gram of 2-oxo-$17\beta$-acetoxy-$\Delta^5$-$10\alpha$-androstene in 80 ml. of tetrahydrofuran and 2 g. of tri-tertiary butoxy-lithium aluminium hydride are refluxed for 2 hours, 5% aqueous acetic acid is added and the whole is worked up as usual. $2\alpha$ - hydroxy - $17\beta$ - acetoxy-$\Delta^5$-$10\alpha$-androstene melts at 200° C. after two recrystallizations from acetone+petroleum ether. $[\alpha]_D = -68°$ (c.=0.69 in chloroform). Bands in the infrared spectrum at 3610, 1724 and 1250 cm.$^{-1}$.

600 mg. of lead tetraacetate and 250 mg. of calcium carbonate are dried for 1 hour under a high vacuum, then suspended in 20 ml. of cyclohexane and boiled for 10 minutes. The boiling mixture is mixed with 130 g. of iodine and then with 100 mg. of $2\alpha$-hydroxy-$17\beta$-acetoxy-$\Delta^5$-$10\alpha$-androstene and boiled for another 1½ hours while being irradiated with two incandescent lamps (210 watt), then filtered through cottonwool, the solution is taken up in ethyl acetate, washed with thiosulphate and saturated sodium chloride solution, dried over magnesium sulphate and evaporated. Chromatography on silica gel in benzene+ethyl acetate 9:1 and crystallization from acetone+petroleum ether furnishes 2α,19-oxido-17β-acetoxy-19-oxo-Δ$^5$-10α-androstene melting at 180° C. $[\alpha]_D = +64°$ (c.=0.27 in chloroform).

1.7 grams of this compound are hydrolyzed in 140 ml. of saturated methanolic potassium carbonate solution overnight at 20° C. The batch is then acidified (pH=5) with dilute hydrochloric acid and evaporated and worked up, to furnish 2α,19-oxido-17β-hydroxy-10-oxo-Δ$^5$-10α-androstene which melts at 225° C. after crystallization from acetone+petroleum ether. $[\alpha]_D = +88°$ (c.=0.50 in chloroform).

1.35 grams of this product are dissolved in 70 ml. of acetone and 1.2 ml. of 8 N-chromium trioxide in 8 N-sulphuric acid are added at 0° C. After 1½ hours the excess oxidant is decomposed by adding a few drops of methanol. Usual working up furnishes 2α,19-oxido-17,19-dioxo-Δ$^5$-10α-androstene which melts at 208° C. after crystallization from acetone+petroleum ether. $[\alpha]_D = +175°$ (c.=0.66 in chloroform).

1.2 grams of this compound with 300 mg. of p-toluenesulphonic acid in a mixture of 200 ml. of benzene and 30 ml. of ethyleneglycol are boiled for 24 hours on a water separator, then poured into an ice-cooled aqueous sodium bicarbonate solution and taken up in methylenechloride, washed and dried and the extract is evaporated to yield 2α,19-oxido - 17 - ethylenedioxy-19-oxo-Δ$^5$-10α-androstene which melts at 233° C. after crystallization from acetone+petroleum ether. $[\alpha]_D = +36°$ (c.=0.75 in chloroform).

750 mg. of this product are boiled for 3 hours with 1.1 g. of lithium aluminium hydride in 100 ml. of tetrahydrofuran. Usual working up furnishes 2α,19-dihydroxy-17-ethylenedioxy-Δ$^5$-10α-androstene melting at 224° C. $[\alpha]_D = -68°$ (c.=0.31 in chloroform).

316 mg. of this compound are boiled for 7 hours with 500 mg. of triphenylchloromethane in 30 ml. of pyridine, then evaporated and worked up in the usual manner. Chromatography in a 10:1-mixture of benzene+ethyl acetate and crystallization from acetone+petroleum ether furnishes 2α-hydroxy-17-ethylenedioxy-19-triphenylmethoxy-Δ$^5$-10α-androstene melting at 211-212° C. $[\alpha]_D = -33°$ (c.=0.58 in chloroform).

While cooling 10 ml. of pyridine, 1.3 g. of chromium trioxide is added, then 780 mg. of the resulting 2α-hydroxy compound in 10 ml. of pyridine are added at 0° C. and the whole is kept for 18 hours at 20° C., then filtered through a glass suction filter and the filtrate is taken up in ethyl acetate. Usual working up and chromatography in a 10:1-mixture of benzene and ethyl acetate and crystallization from acetone+petroleum ether furnishes 2-oxo-17-ethylenedioxy - 19 - triphenylmethoxy-Δ$^5$-10α-androstene melting at 215° C. $[\alpha]_D = -20°$ (c.=0.77 in chloroform).

EXAMPLE 2

A mixture of 1764 mg. of 2-oxo-17-ethylenedioxy-19-triphenylmethoxy-5α-10α-androstane and 1760 mg. of hydroxylamine hydrochloride in 80 ml. of pyridine is boiled for 2 hours, then evaporated and worked up in the usual manner. The resulting crude product is chromatographed on silica gel (Merck, 0.05-0.2 mm.) and eluted with a 10:1-mixture of benzene and ethyl acetate. The eluate is evaporated and recrystallized from acetone+petroleum ether, to furnish 2-oximino-17-ethylenedioxy-19-triphenylmethoxy - 5α,10α - androstane melting at 210° C. $[\alpha]_D = -16°$ (c.=0.42 in chloroform).

A solution of 1460 mg. of this compound in 8 ml. of dioxan is mixed at 5° C. with 1 ml. of thionylchloride. The mixture is kept for 2 hours at 20° C., then poured into an ice-cooled aqueous sodium bicarbonate solution, taken up in methylenechloride and the extract is dried over sodium sulphate and evaporated, chromatographed on silica gel and eluted with ethyl acetate. Two crystallizations from acetone+petroleum ether furnish 2-oxo-3-aza-17-ethylenedioxy - 19 - triphenylmethoxy-5α,10α-A-homo-androstane melting at 267-269° C. $[\alpha]_D = +2°$ (c.=0.46 in chloroform).

A mixture of 275 ml. of this compound and 0.6 g. of lithium aluminium hydride in 100 ml. of dioxan is boiled for 20 hours, then water is dropped in while cooling with ice, the precipitated inorganic phase is filtered off, washed with methylenechloride and the filtrate is evaporated to dryness. The resulting mixture is acetylated and chromatographed in the usual manner, to yield N-acetyl-3-aza-17-ethylenedioxy-19-triphenylmethoxy - 5α,10α - A-homo-androstane melting at 202° C. $[\alpha]_D = +18°$ (c.=0.45 in chloroform) and N-acetyl-3-aza-17-ethylenedioxy-19-acetoxy-A-homo-5α,10α-androstane melting at 132-134° C. $[\alpha]_D = +52°$ (c.=0.16 in chloroform).

N-acetyl-3-aza - 17 - ethylenedioxy - 19 - acetoxy-5α,10α-androstane can be hydrolyzed with acetic acid to form N-acetyl-3-aza-17-oxo-19-acetoxy - 5α,10α - A - homo-androstane as described in Example 1 which melts at 171-172° C. after crystallization from acetone+petroleum ether. $[\alpha]_D = +135°$ (c.—0.41 in chloroform).

In the manner described in Example 1 N-acetyl-3-aza-17-ethylenedioxy - 19 - triphenylmethoxy-5α,10α-A-homo-androstane can be converted into N-acetyl-3-aza-17-oxo-19-acetoxy-5α,10α-A-homo-androstane which is identical with the compound described above.

90 mg. of N-acetyl-3-aza - 17 - oxo-19-acetoxy-5α,10α-A-homo-androstane are hydrolyzed overnight at room temperature in 10 ml. of saturated methanolic potassium carbonate solution. Usual working up and chromatography on silica gel in ethylacetate+methanol 9:1 furnishes amorphous N-acetyl-3-aza-19-hydroxy - A - homo-5α,10α-androstane whose infrared spectrum contains bands at 3580, 1730 and 1625 cm.$^{-1}$.

The starting material used in this example may be prepared, for example, thus 500 mg. of 2α-hydroxy - 17β - acetoxy-Δ$^5$-androstane in 75 ml. of ethanol are exhaustively hydrogenated in the presence of 100 mg. of palladium carbon catalyst (5% Pd). The catalyst is filtered off, the filtrate evaporated under vacuum and the crude product is taken up in methylenechloride and filtered through alumina (neutral, activity III) and chromatographed on silica gel, to furnish the oily 2α-hydroxy-17β-acetoxy-5α,10α-androstane whose infrared spectrum contains bands at 3600, 1725 and 1255 cm.$^{-1}$.

500 mg. of this compound are reacted with lead tetraacetate and iodine in cyclohexane as described in Example 1, then worked up and chromatographed on silica gel (Merck, 0.05-0.2 mm). Recrystallization of the eluate from acetone+petroleum ether furnishes 2α,19-oxido-17β-acetoxy-19-oxo-5α,10α-androstane melting at 174-175° C. $[\alpha]_D = +37°$ (c.=0.40 in chloroform).

This compound is hydrolyzed by the method described in Example 1 to yield 2α,19-oxido-17β-hydroxy-19-oxo-5α,10α-androstane melting at 162-163° C. $[\alpha]_D = +47°$ (c.=0.46 in chloroform), then oxidized to 2α,19-oxido-17,19-dioxo-5α,10α-androstane melting at 201° C. $[\alpha]_D = +131°$ (c.=0.45 in chloroform), then converted into 2α,19-oxido-17-ethylenedioxy - 19 - oxo - 5α,10α - androstane melting at 229-230° C. $[\alpha]_D = +19°$ (c.=0.48 in chloroform), reduced with lithium-aluminium hydride to form 2α,19-dihydroxy - 17 - ethylenedioxy-5α,10α-androstane melting at 194-196° C. $[\alpha]_D = -14°$ (c.=0.56 in chloroform), which is then reacted with triphenylchloromethane to form 2α-hydroxy-17-ethylenedioxy - 19 - triphenylmethoxy-5α,10α-androstane and then oxidized to form 2-oxo-17-ethylenedioxy - 19 - triphenylmethoxy-5α,10α-androstane melting at 224° C. $[\alpha]_D$ (c.=0.50 in chloroform).

EXAMPLE 3

2 grams of 3-oxo-17β,19-diacetoxy-Δ⁴-androstene and 2 g. of hydroxylamine hydrochloride in 40 ml. of pyridine are heated for 1½ hours at 90° C. and then evaporated under vacuum. The residue is taken up in methylenechloride, the solution washed neutral, dried over sodium sulphate and evaporated, to furnish 3-oximino-17β-19-diacetoxy-Δ⁴-androstene as an amorphous product whose infrared spectrum contains bands at 3580, 1730 and 1240 cm.⁻¹.

A solution of 11.5 g. of this oxime in 50 ml. of dioxan is mixed with 2 ml. of thionylchloride. The reaction mixture is heated for 1 hour at 60° C., then neutralized with ice-cold aqueous sodium bicarbonate solution and extracted with methylenechloride. The extract is washed neutral, dried and evaporated, twice chromatographed on silica gel (Merck, 0.05–0.2 mm.) and eluted with a 10:1-mixture of ethyl acetate and methanol and recrystallized from acetone+petroleum ether, to yield 3-aza-4-oxo-17β,19-diacetoxy-A-homo-Δ⁴ᵃ-androstene melting at 195° C. $[\alpha]_D = +53°$ (c.=0.49 in chloroform). Its infrared spectrum contains bands at 3420, 1730, 1655 and 1240 cm.⁻¹.

3 grams of this product are exhaustively hydrogenated in the presence of 1 g. of palladium carbon catalyst in 200 ml. of ethanol. The catalyst is filtered off, the filtrate evaporated and the residue recrystallized from acetone+petroleum ether. The resulting 3-aza-4-oxo-17β,19-diacetoxy-A-homo-5α-androstane has the double melting point of 133/165° C. $[\alpha]_D = 3°$ (c.=0.39 in chloroform). Its infrared spectrum contains bands at 3410, 1730, 1665 and 1245 cm.⁻¹.

320 mg. of this product are boiled for 20 hours with 600 mg. of lithium-aluminium hydride in 100 ml. of dioxan. Then, while cooling with ice, water is dropped in, the precipitated inorganic phase is filtered off, washed with methylenechloride, and the filtrate is evaporated to dryness, to furnish crude 3-aza-17β,19-dihydroxy-A-homo-5α-androstane. 100 mg. of this product are acetylated for 1 hour in a waterbath and chromatographed on silica gel. Elution with ethyl acetate furnishes amorphous N-acetyl-3-aza-17β,19-diacetoxy-A-homo-5α-androstane whose infrared spectrum contains bands at 1730, 1625 and 1250 cm.⁻¹.

50 mg. of this product are hydrolyzed overnight in 5 ml. of saturated methanolic potassium carbonate solution. Two crystallisations from acetone+petroleum ether furnish N-acetyl-3-aza-17β,19-dihydroxy-A-homo-5α-androstane melting at 244 to 246° C. $[\alpha]_D = -23°$ (c.=0.44 in ethanol). Its infrared spectrum contains bands at 3500–3100 and 1620 cm.⁻¹.

EXAMPLE 4

A solution of 5.1 g. of 3-oxo-17β,19-diacetoxy-5β-androstane in 70 ml. of pyridine is boiled for 2 hours with 5.1 g. of hydroxylamine hydrochloride, then evaporated to dryness, taken up in methylenechloride, washed neutral and chromatographed on silica gel (Merck, 0.05–0.2 mm.), eluted with a 2:1-mixture of benzene+ethyl acetate, evaporated and the residue is twice recrystallized from ether+petroleum ether. The resulting 3-oximino-17β,19-diacetoxy-5β-androstane melts at 142° C. $[\alpha]_D = +39°$ (c.=0.94 in chloroform). Its infrared spectrum contains bands at 3580, 1730 and 1250 cm.⁻¹.

2.1 grams of this product are dissolved in 10 ml. of dioxan and mixed at 5° C. with 1 ml. of thionylchloride. The mixture is kept for 2 hours at 20° C., then poured into ice-cooled aqueous sodium bicarbonate solution and extracted with methylenechloride. The extract is washed, dried over sodium sulphate and evaporated. After chromatography on silica gel and elution with ethyl acetate a product is obtained which melts at 204–206° C. After three recrystallizations from ether+petroleum ether the melting point rises to 205–207° C. $[\alpha]_D = +29°$ (c.=0.53 in chloroform).

2 grams of this mixture of 3-aza-4-oxo- and 3-oxo-4-aza-17β,19-diacetoxy-A-homo-5β-androstane are boiled for 20 hours with 4 g. of lithium-aluminium hydride in 800 ml. of dioxane. Then while cooling with ice, water is dropped in, the precipitated inorganic phase is filtered off, rinsed with methylene chloride and the filtrate is evaporated, to yield after acylation a mixture of N-acetyl-3-aza- and N-acetyl-4-aza-17β,19-diacetoxy-A-homo-5β-androstane which melts at 144–145° C. after two recrystallizations from acetone+petroleum ether. $[\alpha]_D = +28°$ (c.=0.40 in chloroform). Its infrared spectrum contains bands at 1730, 1625 and 1250 cm.⁻¹.

We claim:
1. 19-hydroxy-3-aza-A-homo-10α-steroids of the formula

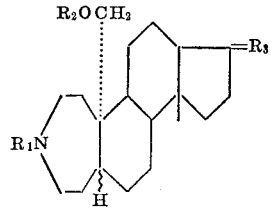

which may contain a double bond in the 4a,5 or in the 5,6-position, in which formula R₁ represents hydrogen or a lower alkanoyl radical, R₂O stands for a free, esterified or etherified hydroxyl group, and R₃ for a free or ketalized oxo group or a β-positioned free, esterified or etherified hydroxyl group together with a hydrogen atom or with a lower alkyl, lower alkenyl or lower alkinyl group or an α-positioned hydrogen atom or an α-positioned free, esterified or etherified hydroxyl group together with an acetyl or hydroxyacetyl group or an α-positioned hydrogen atom together with the 1',5'-dimethylhexyl group, each of said ester groups being derived from a carboxylic acid with 1–20 carbon atoms and each of said ether groups being derived from a lower alkanol, a furanol or a pyranol.

2. N-acetyl-3-aza-17-ethylendioxy-19-triphenylmethoxy-Δ⁵-10α-A-homo-androstene.

3. N-acetyl-3-aza-17-ethylendioxy-19-acetoxy-Δ⁵-10α-A-homo-androstene.

4. N-acetyl-3-aza-17-oxo-19-acetoxy-Δ⁵-10α-A-homo-androstene.

5. N-acetyl-3-aza-17-ethylenedioxy-19-acetoxy-A-homo-5α,10α-androstane.

6. N-acetyl-3-aza-17-ethylenedioxy-19-triphenylmethoxy-A-homo-5α,10α-androstane.

7. N-acetyl-3-aza-17-oxo-19-acetoxy-A-homo-5α-10α-androstane.

8. N-acetyl-3-aza-19-hydroxy-A-homo-5α,10α-androstane.

9. N-acetyl-3-aza-17β,19-diacetoxy-A-homo-5α-androstane.

10. N-acetyl-3-aza-17β,19-dihydroxy-A-homo-5α-androstane.

References Cited
UNITED STATES PATENTS
3,505,356    4/1970    Sallay _____ 260—239

OTHER REFERENCES
Shoppee et al.: J. Chem. Soc. (London), 1961, pp. 3641–3655.

Adams: Editor, Organic Reactions, vol. 11 (John Wiley & Sons, Inc., New York, 1960), pp. 14, 32, 114–118.

ALTON D. ROLLINS, Primary Examiner

U.S. Cl. X.R.

260—239.3 P, 340.7, 340.9, 345.7, 345.9, 347.4, 347.7, 348 A, 395, 397.1; 424—244